May 31, 1960  J. M. WETZLER  2,938,333
COMBUSTION CHAMBER LINER CONSTRUCTION
Filed March 18, 1957
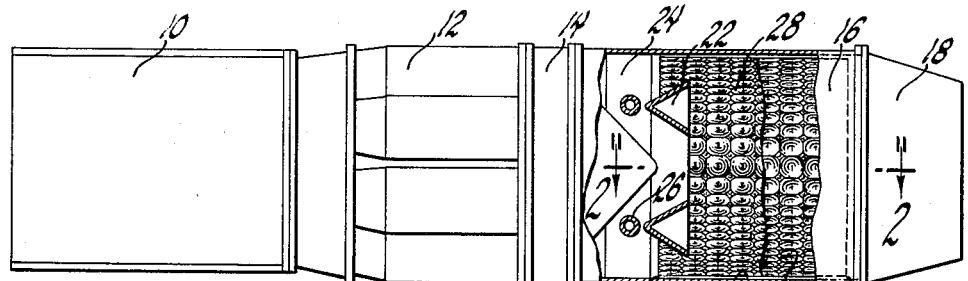
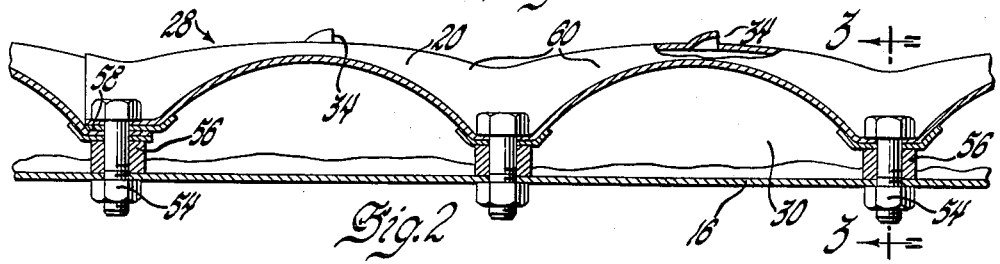
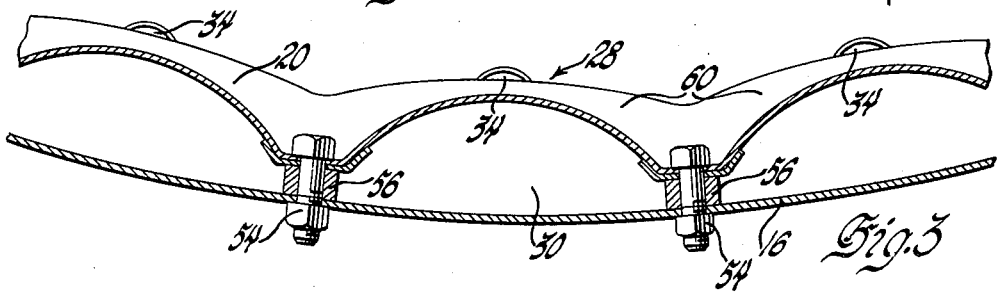
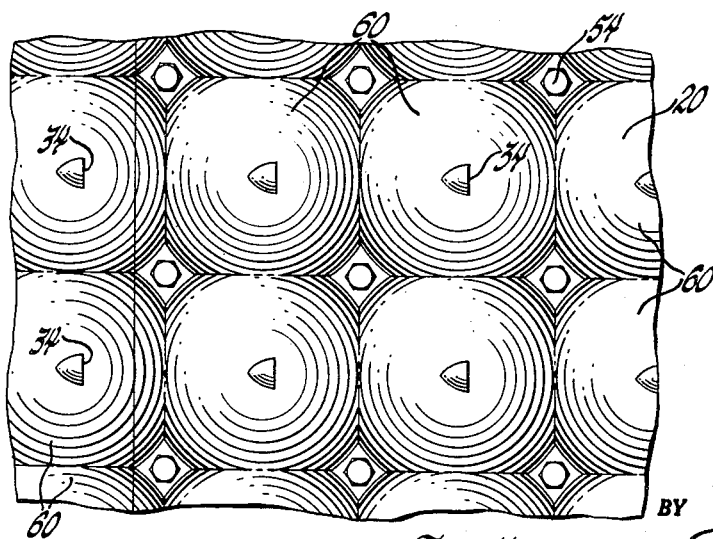
INVENTOR.
John M. Wetzler
BY
E. W. Christen
ATTORNEY

United States Patent Office 2,938,333
Patented May 31, 1960

2,938,333

COMBUSTION CHAMBER LINER CONSTRUCTION

John M. Wetzler, Indianapolis, Ind., assignor to General Motors Corporation, Detroit, Mich., a corporation of Delaware Filed Mar. 18, 1957, Ser. No. 646,814

2 Claims. (Cl. 60—35.6)

This invention relates to gas turbine jet engines and more particularly to liner constructions for the combustion chamber of the afterburner portion of such engines.

In a turbojet engine the amount of heat added in the combustor is limited by the ability of the downstream turbine structure to withstand high temperatures. The limitation is such that only about 30% of the available oxygen in the air flow through the engine can be burned in the combustor. The turbine exhaust gas is accordingly rich in unburned oxygen to which fuel can be supplied to provide an increase in thrust and turbojet engines are, therefore, provided with afterburners whereby fuel is burned in a combustion chamber aft of the turbine. In the usual engine the turbine exhaust gas temperature is in the neighborhood of 1700° R. and sufficient fuel can be burned in the afterburner combustion chamber to raise the exhaust gas temperature to about 3500° R. since there is no structure downstream of the afterburner that is directly in the exhaust path. The afterburner casing interconnects the turbine casing with a variable area jet exhaust nozzle and some form of cooling is required to shield the afterburner casing from the 3500° R. afterburning gases to maintain its structural integrity and also to reduce radiation to proximate external mechanisms and to adjacent aircraft structure.

The invention provides a liner that is spaced within the interior of the afterburner casing to protect the casing from the burning gases in the afterburner combustion chamber. The liner and the afterburner casing form an annular chamber or passage around the afterburner combustion chamber and a small percentage, about 5 to 10%, of the 1700° R. turbine exhaust gases are passed through the annular chamber to provide a relatively cool gas shield for the afterburner casing. The liner also acts as a radiation shield to protect the afterburner casing. The liner is a thin shell since it does not act as a highly stressed structural part for the pressure in the annular cooling chamber is but slightly greater than the pressure in the afterburner combustion chamber. This slight pressure differential results from the combustion process in the afterburner inasmuch as heat is added to the turbine exhaust gases in a substantially constant cross-sectional area at fairly high velocities (300 to 600 ft./sec.) so that a small total pressure loss occurs in the afterburning gases. This pressure loss is related to the heat added to the turbine exhaust gases to speed them up and is known as the "momentum pressure loss."

In the drawings:

Figure 1 is a schematic elevation, partially broken away, of a gas turbine jet engine incorporating the afterburner construction of the invention;

Figure 2 is a partial longitudinal section of the liner construction taken substantially on the plane indicated by the line 2—2 of Figure 1;

Figure 3 is a partial transverse section of the liner construction taken substantially on the plane indicated by the line 3—3 of Figure 2; and Figure 4 is a partial plan view of the liner construction as viewed from the interior of the liner.

Referring to Figure 1, a conventional gas turbine jet engine is shown as comprising an axial flow compressor 10 feeding a plural flame tube combustor 12 which feeds an axial flow turbine 14 that drives the compressor 10 and that exhausts through an afterburner casing or tailpipe 16 and a variable area jet nozzle 18. The afterburner casing 16 is a cylindrical pipe of substantially constant cross-sectional area and has the inventive liner 20 therein. An annular flameholder 22 of V-shaped cross-section is mounted by radial tail cone supporting struts 24 at the turbine exhaust outlet and a ring-shaped afterburner fuel spray pipe 26 is also mounted on the struts 24 to inject fuel into the turbine exhaust gas stream for subsequent combustion downstream of the flameholder 22 and in the afterburner combustion chamber 28. The arrangement is conventional, other than the afterburner liner, and need not be described in further detail.

Referring to the remaining figures, the liner 20 comprises a thin-walled shell which is secured to the inner wall of the afterburner casing 16 in closely spaced relation thereto to provide an annular cooling chamber 30 about the afterburner combustion chamber 28. The annular chamber 30 is open at its upstream end 31 to the outer periphery of the turbine exhaust gas stream and its downstream end 32 to the exhaust nozzle 18 so that a very small percentage of the turbine exhaust gas stream may be fed about the exterior of the liner 20 without passing through the afterburner combustion chamber 28. The liner 20 may also be provided with a plurality of small passages 34 regularly spaced throughout its entirety to feed a very small percentage of the turbine exhaust gas to the afterburner combustion chamber 28 from the annular chamber 30. The pressure in the nozzle entrance and in the chamber 28 is less than that in the chamber 30 because of the "momentum pressure loss" in the chamber 28 due to afterburning and the outer surface of the liner 20 and the inner surface of the casing 16 will accordingly be bathed with the turbine exhaust gases to cool the surfaces as the turbine exhaust gases pass through the length of the annular chamber 30. If the passages 34 are provided, a slight flow of turbine exhaust gas will also bathe the inner surface of the liner 20 and afford gas-film cooling thereof.

The liner 20 is of minimum weight since it is merely a thin shell or membrane that need only withstand the slight pressure differential between the annular cooling chamber 30 and the afterburner combustion chamber 28. This thin liner shell, however, serves to shield the afterburner casing from the high temperature afterburning gases to maintain its structural integrity by providing a relatively cool turbine exhaust gas film in the interior of the casing and by providing a radiation cover therefor.

The liner 20 is secured to the inner wall of the afterburner casing 16 by a plurality of regularly spaced bolts 54. Bushings 56 space the liner 20 radially inward of the afterburner casing to form the annular cooling chamber 30. The liner 20 may be made in sections; that is, it may consist of a plurality of arcuate segments which meet with their edges in overlapping relation as seen at 58 in Figure 2. Each of the segments of the liner is formed of a plurality of integrally interconnected, generally rectangular cup-like portions 60 which are arranged in inverted relation to the inner wall of the afterburner casing 16. The liner thus has a quilt-like or checkerboard appearance as seen in Figures 1 and 4, and each of the cup-like portions 60 is secured at its corners to the afterburner casing 16 by the bolts 54.

The liner portions 60 are thin enough to be somewhat flexible and have a domed configuration to equalize the stress throughout the portions. Since the portions are of minimum thickness the liner 20 will be of minimum weight. The dome or cup-like configuartion of the portions 60 results from a consideration of the fact that when it is desired to separate two passages or volumes which are at different pressures the lightest separating structure will be the one whose shape is that taken by a flexible membrane separating the volumes, the exact shape and curvature of the membrane being determined by the number and pattern of restraining points or supports on the membrane and by the elastic properties of the membrane material. The configuration also accommodates thermal expansion. This can be seen by considering the effect of expansion on a square flat plate rigidly secured at its four corners. The plate would, of course, tend to buckle away from its flat condition on expansion and repeated buckling would cause cracks in the plate. The liner portions 60, however, being of curved section between the points of securement will merely grow in curvature during expansion and thereby avoid the buckling problem. It should be realized that the flow of turbine exhaust gas through the cooling chamber 30 is determined by the radial spacing of the liner 20 from the casing 16 and by the number and size of the passages 34 and that the quantity of flow need only be sufficient to carry away the heat transferred to the cooling chamber from the afterburner chamber through the liner.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

I claim:

1. A jet engine afterburner comprising a gas turbine, a jet nozzle, a cylindrical casing interconnecting the turbine and nozzle to transmit exhaust gas from the turbine to the nozzle for discharge therefrom, means for supplying fuel to the turbine exhaust gas to obtain afterburning in the casing, and a liner in the casing providing a combustion chamber for the afterburner, said liner being a thin shell secured to the inner wall of the casing in closely spaced relation thereto to provide an annular chamber about the afterburner combustion chamber, the annular chamber being open at its upstream end to the turbine exhaust gas and being open at its downstream end to the afterburner exhaust gas, a portion of the turbine exhaust gas being transmitted into said annular chamber and the remainder being transmitted directly through the cylindrical casing, the shell having passages spaced throughout its entirety for feeding some of the turbine exhaust gas within said annular chamber to said afterburner combustion chamber, the shell comprising a plurality of edge-interconnected cup-like portions each inverted to the inner wall of the casing, each cup-like portion having peripheral corners and each cup-like portion being secured at its peripheral corners to the inner wall of the casing to provide cellular chambers over the periphery of the combustion chamber, the edge-interconnections of the cup-like portions forming arched junctions between the corner points of securement.

2. A combustion chamber comprising a cylindrical casing, a liner arranged in the casing in closely spaced relation with the inner wall thereof, the liner having a plurality of inverted domes edge-interconnected with each other in quilt-like fashion to provide an annular cellular chamber about the periphery of the combustion chamber, each of the domes having a central passage therethrough to provide communication between the annular cellular chamber and the combustion chamber, each of the domes having peripheral corners and means for securing said domes at said peripheral corners to the casing, the edge-interconnections of the domes forming arched junctions between the corner points of securement.

References Cited in the file of this patent

UNITED STATES PATENTS

| | | |
|---|---|---|
| 2,397,658 | Goddard | Apr. 2, 1946 |
| 2,639,578 | Pouchot | May 26, 1953 |
| 2,667,033 | Ashwood | Jan. 26, 1954 |
| 2,794,319 | Stockdale | June 4, 1957 |